(12) United States Patent
Haynam et al.

(10) Patent No.: US 8,486,172 B2
(45) Date of Patent: Jul. 16, 2013

(54) FILTER ELEMENT ARRANGEMENT AND END CAP INTERFACE FEATURE

(75) Inventors: Travis Haynam, Maineville, OH (US); Steve Trame, Springboro, OH (US)

(73) Assignee: United Air Specialists, Inc., Cincinnati, OH (US)

( * ) Notice: Subject to any disclaimer, the term of this patent is extended or adjusted under 35 U.S.C. 154(b) by 407 days.

(21) Appl. No.: 12/741,230

(22) PCT Filed: Nov. 7, 2008

(86) PCT No.: PCT/US2008/082747
§ 371 (c)(1),
(2), (4) Date: Jul. 2, 2010

(87) PCT Pub. No.: WO2009/061998
PCT Pub. Date: May 14, 2009

(65) Prior Publication Data
US 2010/0263344 A1    Oct. 21, 2010

Related U.S. Application Data

(60) Provisional application No. 60/986,744, filed on Nov. 9, 2007.

(51) Int. Cl.
*B01D 46/00* (2006.01)
(52) U.S. Cl.
USPC .......... 55/356; 55/428; 55/429; 55/471; 55/480; 55/493; 55/498; 55/502
(58) Field of Classification Search
USPC .......... 55/417, 428, 429, 478–481, 490, 55/493–511, 521, 529; 96/424
See application file for complete search history.

(56) References Cited

U.S. PATENT DOCUMENTS

| | | | |
|---|---|---|---|
| 2,409,078 A | 10/1946 | Swann | |
| 4,007,026 A | 2/1977 | Groh | |
| 4,204,846 A | 5/1980 | Brenholt | |
| 4,211,543 A | 7/1980 | Tokar et al. | |
| 4,304,580 A | 12/1981 | Gehl et al. | |
| 4,629,482 A | 12/1986 | Davis | |
| 4,759,783 A * | 7/1988 | Machado | 55/498 |
| 4,765,811 A | 8/1988 | Beckon | |
| 5,145,496 A | 9/1992 | Mellen | |
| 5,295,602 A | 3/1994 | Swanson | |
| 6,036,757 A * | 3/2000 | Gatchell et al. | 96/424 |
| 6,093,237 A | 7/2000 | Keller et al. | |
| 6,235,194 B1 | 5/2001 | Jousset | |
| 7,070,642 B2 | 7/2006 | Scott et al. | |
| 2001/0000845 A1 * | 5/2001 | Coulonvaux | 55/498 |
| 2003/0226800 A1 | 12/2003 | Brown et al. | |
| 2006/0225389 A1 * | 10/2006 | Scott et al. | 55/498 |

FOREIGN PATENT DOCUMENTS

| | | |
|---|---|---|
| CN | 1826163 A | 8/2006 |
| EP | 0329659 A1 | 8/1989 |
| WO | WO 99/37386 A1 | 7/1999 |
| WO | WO 2004/039476 A1 | 5/2004 |
| WO | WO 2005/068051 A1 | 7/2005 |

OTHER PUBLICATIONS

U.S. Appl. No. 12/741,398, filed May 5, 2010, Haynam et al.

* cited by examiner

*Primary Examiner* — Duane Smith
*Assistant Examiner* — Sonji Turner
(74) *Attorney, Agent, or Firm* — Reinhart Boerner Van Deuren P.C.

(57) ABSTRACT

A filter element including an end cap is provided. The end cap includes an annular seal support carrying an annular seal member and a mounting arrangement to seal and support the filter element in a filter housing. The end cap is configure to engage with a mating engagement structure of the housing to provide self alignment feature of the filter element.

38 Claims, 13 Drawing Sheets

US 8,486,172 B2

FILTER ELEMENT ARRANGEMENT AND END CAP INTERFACE FEATURE

CROSS-REFERENCE TO RELATED PATENT APPLICATIONS

This patent application is the National Stage of International Application No. PCT/US2008/082747, filed Nov. 7, 2008, that claims the benefit of U.S. Provisional Application No. 60/986,744 filed Nov. 9, 2007, the entire teachings and disclosure of which are incorporated herein by reference thereto.

FIELD OF THE INVENTION

This invention generally relates to a filter element and more particularly relates to end cap arrangements of the filter element.

BACKGROUND OF THE INVENTION

Filter elements and their end cap arrangements for mounting the filter elements in various housings are known. The present invention relates to improvements over such designs.

BRIEF SUMMARY OF THE INVENTION

In one aspect, the invention provides a filter element including a tubular ring of filter media, a bottom end cap sealingly bonded to a bottom end of the tubular ring of filter media, and a top end cap. The top end cap includes an annular disc portion having a central opening, an outer peripheral wall, an annular seal support and a radial spacer wall. The annular disc portion is sealingly bonded to a top end of the tubular ring of filter media. The outer peripheral wall extends axially from the annular disc portion toward the bottom end cap. The annular seal support is spaced radially outward from the outer peripheral wall by the radial spacer wall to provide an annular receiving channel defined between the outer peripheral wall and the annular seal support. Further, an annular seal member is carried by the annular seal support.

In another aspect, the invention provides an end cap for a filter element including an annular disc portion having a central opening, an outer peripheral wall, an annular seal support and a radial spacer wall. The annular disc portion is sealingly bonded to a top end of the tubular ring of filter media. The outer peripheral wall extends axially from the annular disc portion toward the bottom end cap. The annular seal support is spaced radially outward from the outer peripheral wall by the radial spacer wall to provide an annular receiving channel defined between the outer peripheral wall and the annular seal support. Further, an annular seal member is carried by the annular seal support.

In yet another aspect, the invention provides an air cleaner assembly including a particulate collection bin having a top panel defining an opening, a hatch arranged over the opening, a hinge connecting the hatch to the particulate collection bin so that the hatch may pivot about the hinge between open and closed positions, and a filter element installed in the opening. The filter element includes a ring of filter media, a top end cap and a bottom end cap mounted to opposed ends of the filter media. The top end cap includes an annular disc portion having a central opening, an outer peripheral wall, an annular seal support and a radial spacer wall. The annular disc portion is sealingly bonded to a top end of the tubular ring of filter media. The outer peripheral wall extends axially from the annular disc portion toward the bottom end cap. The annular seal support is spaced radially outward from the outer peripheral wall by the radial spacer wall to provide an annular receiving channel defined between the outer peripheral wall and the annular seal support. Further, an annular seal member is carried by the annular seal support, wherein the annular seal member rests upon and seals against the top panel around the opening.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
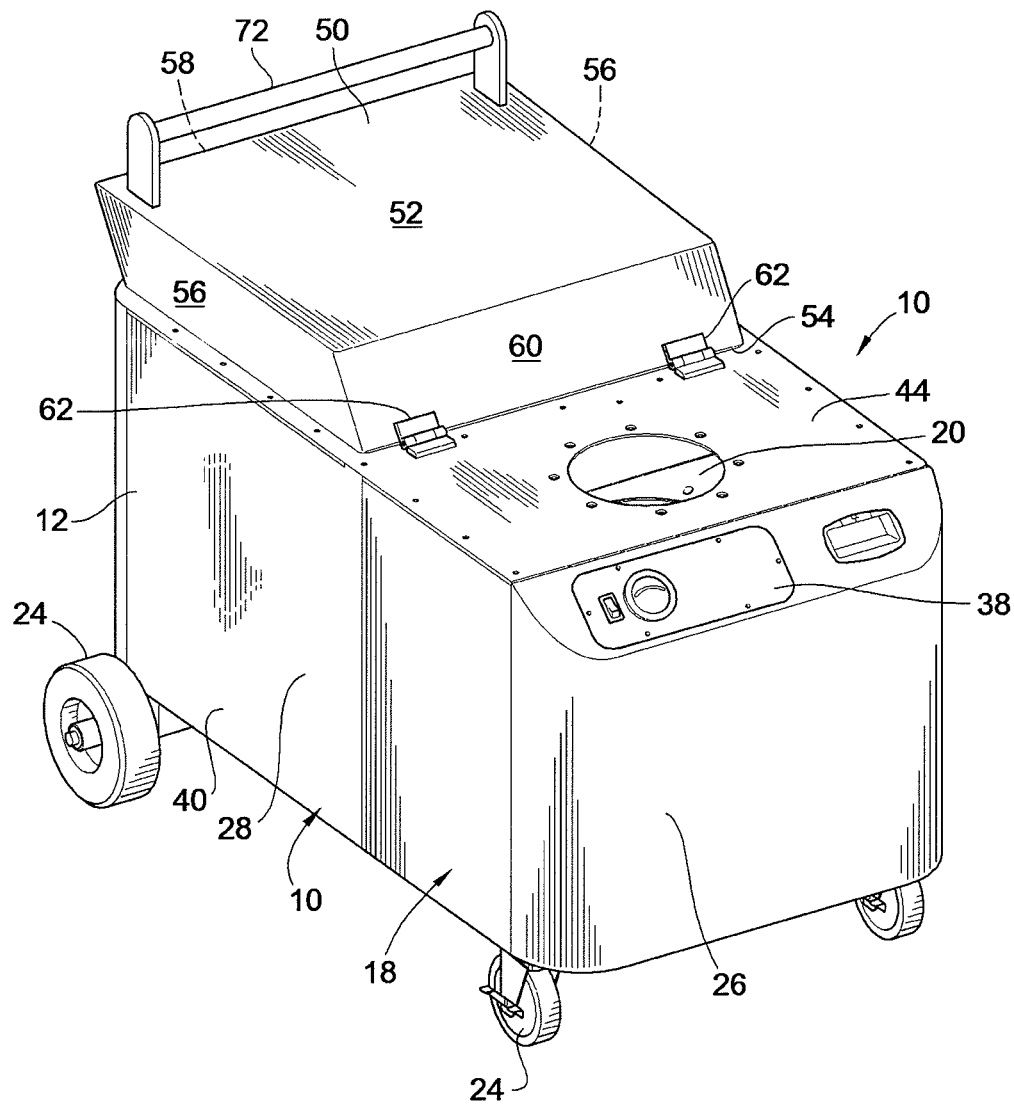
FIG. 1 is an isometric view of a portable air cleaner assembly in accordance with an embodiment of the present invention.
Figure 2:
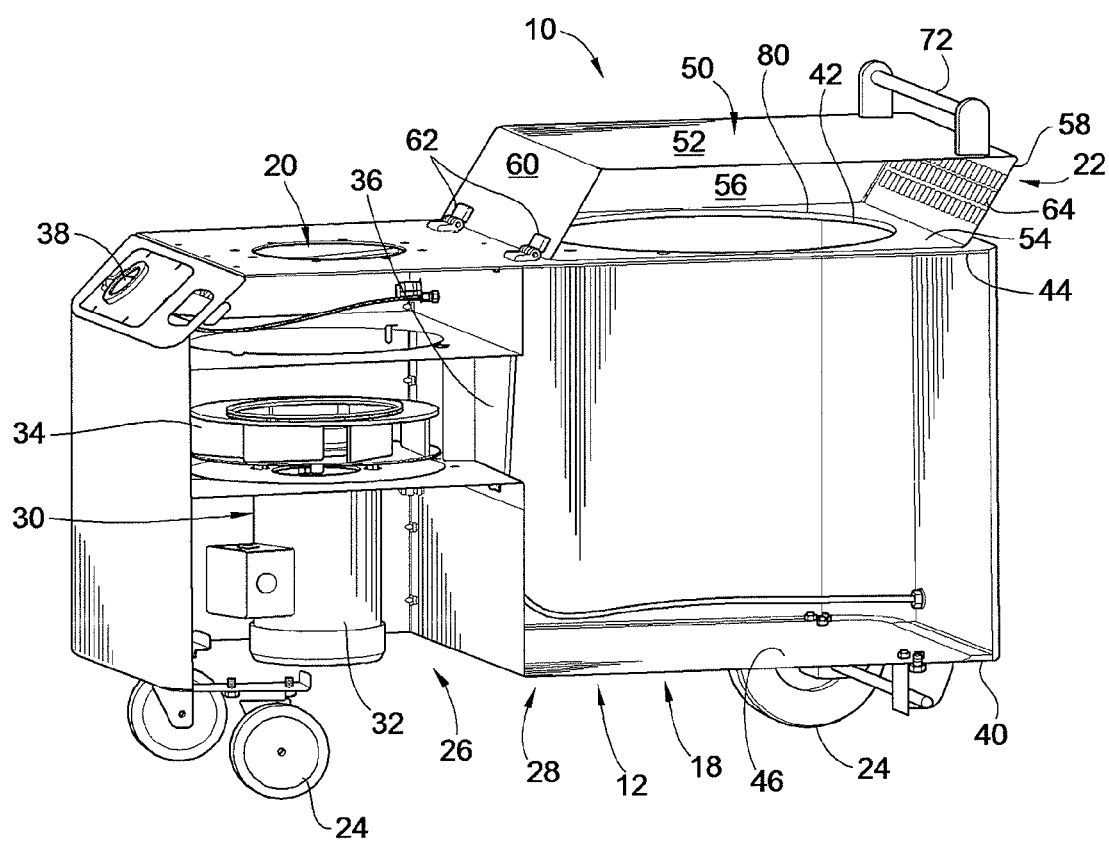
FIG. 2 is a different isometric view of the portable air cleaner assembly of FIG. 1 with the air cleaner assembly being shown in partial cross sectional view (with the filter element not installed)

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As shown in the figures, a preferred embodiment of the present invention takes the form of an air cleaner assembly 10 including generally a filter housing 12 and a replaceable and disposable filter element 14 contained within the housing 12. The air cleaner assembly is designed to be used in connection as a portable unit and/or as a localized wall unit as a dust collector for localized filtration of filter particulates from an air stream. As such, typically only one filter element 14 is provided for the overall air cleaner assembly 10. For example, the air cleaner assembly 10 may be used as an industrial dust collector for filtration of particulates from localized industrial areas where production of such particulates are generated such as welding operations. As such, many of these air cleaner assemblies 10 can be located at strategic locations throughout a manufacturing plant without having ductwork to an external environment. Instead, these air cleaner assemblies 10 are designed to filter the air locally and return the clean air to the same environment.

The filter housing 12 generally includes a dust collection bin 18 and an access hatch 50. The filter housing 12 has an air inlet 20 (which may connect to an intake duct) for receipt of a particulate laden air stream and an air outlet 22 for communicating the filtered clean air stream back into the localized environment. As shown, the air cleaner assembly 10 and the dust collection bin 18 is in the form of a portable unit that may be readily pushed around on wheels 24 and thereby moved from place to place within a manufacturing facility where local filtration may be desired.

The dust collection bin 18 generally includes two different regions including an air intake region 26 and a dust collection region 28. The air intake region 26 generally includes a blower 30 including an electrical motor 32 and a impeller 34 that is operative to draw the air in through the air inlet 20 and blow the air inlet stream in through an internal port 36 into the dust collection region 28. A control panel 38 may be provided to facilitate selective operation of the blower 30 and thereby the air cleaner assembly 10.

The dust collection region 28 generally includes a box-like housing structure which is generally enclosed except for the internal port 36 to receive the inlet air stream and a circular opening 42 provided vertically through a top panel 44. A trap door 46 may also be provided at the bottom end which can be manually closed and opened to collect and empty any dust cake which may have fallen off of the filter element 14 during operation. The filter element 14 is received through the circular opening 42 and rests and is supported upon the top panel 44.

Figure 3:
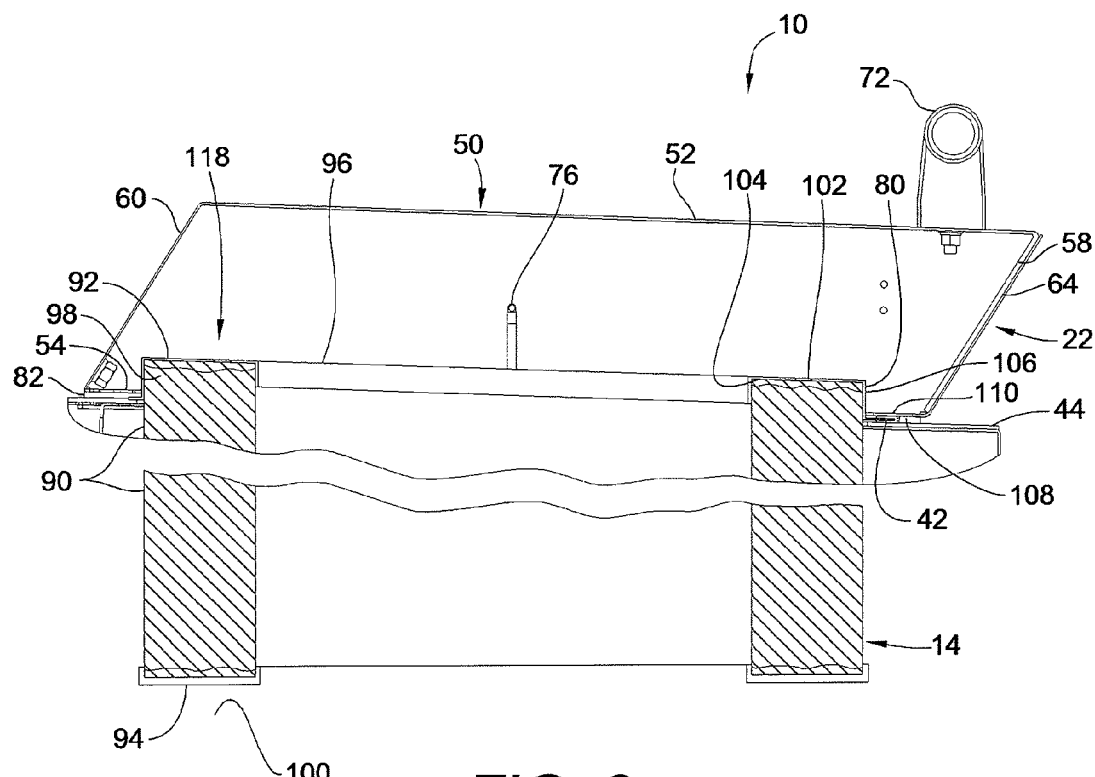
FIG. 3 is a cross sectional view of the hatch, top panel of the collection bin and the filter element engaged therewith (break lines cutting through the filter element)
Figure 4:
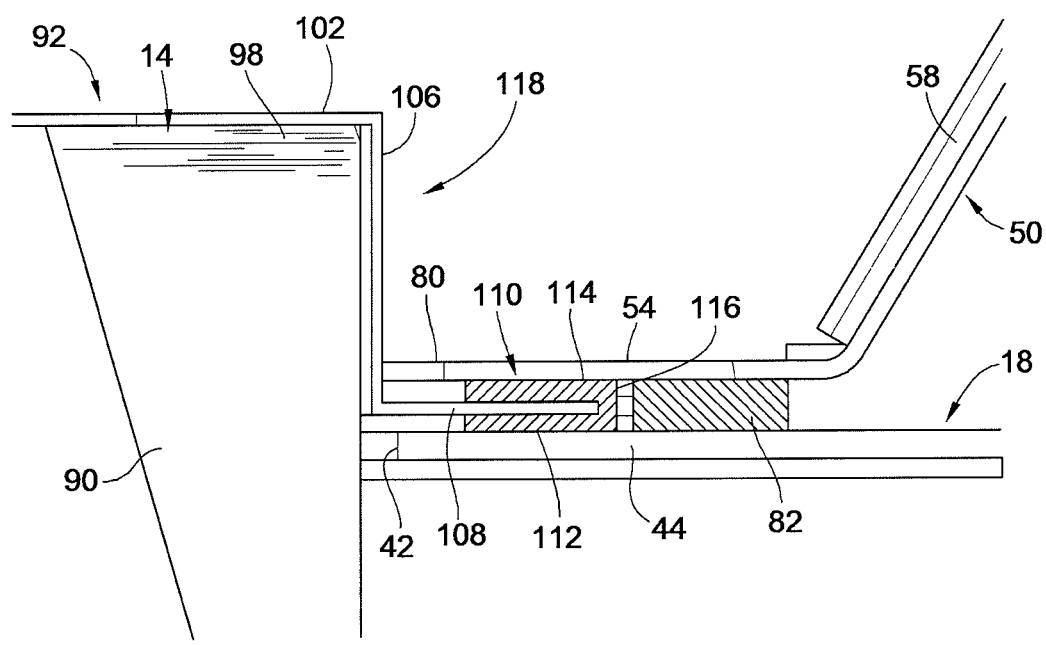
FIG. 4 is an enlarged view of a portion of FIG. 3 to better illustrate the sealing engagement between the filter element, the top panel of the dust collection bin and the access hatch.
Figure 5:
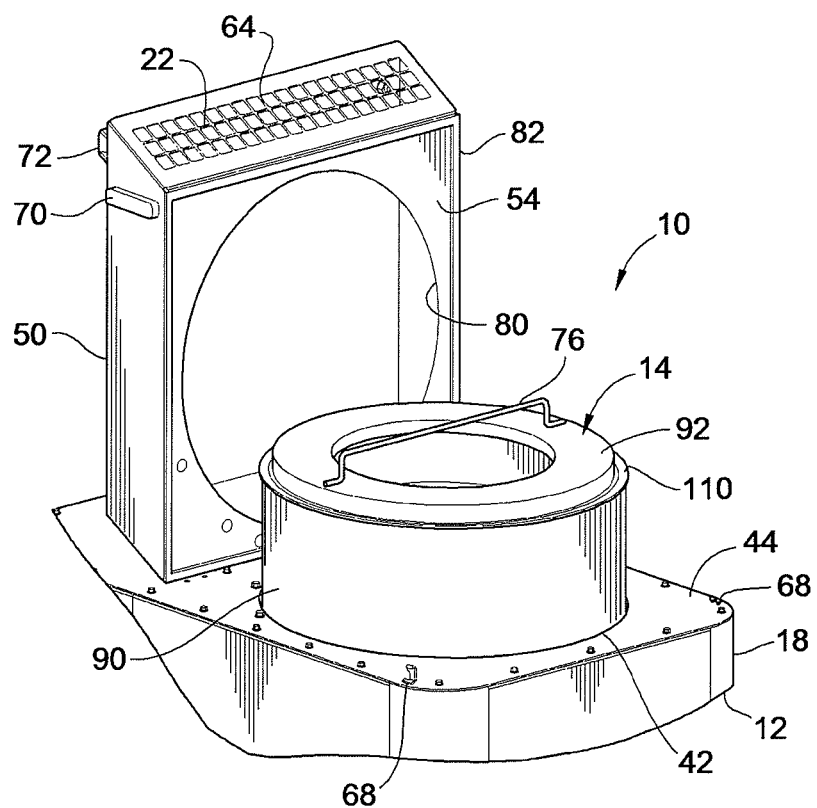
FIG. 5 is an isometric view of a portion of the portable air cleaner assembly with the access hatch open and the filter element partially lifted out of the central opening of the dust collection bin.
Figure 6:
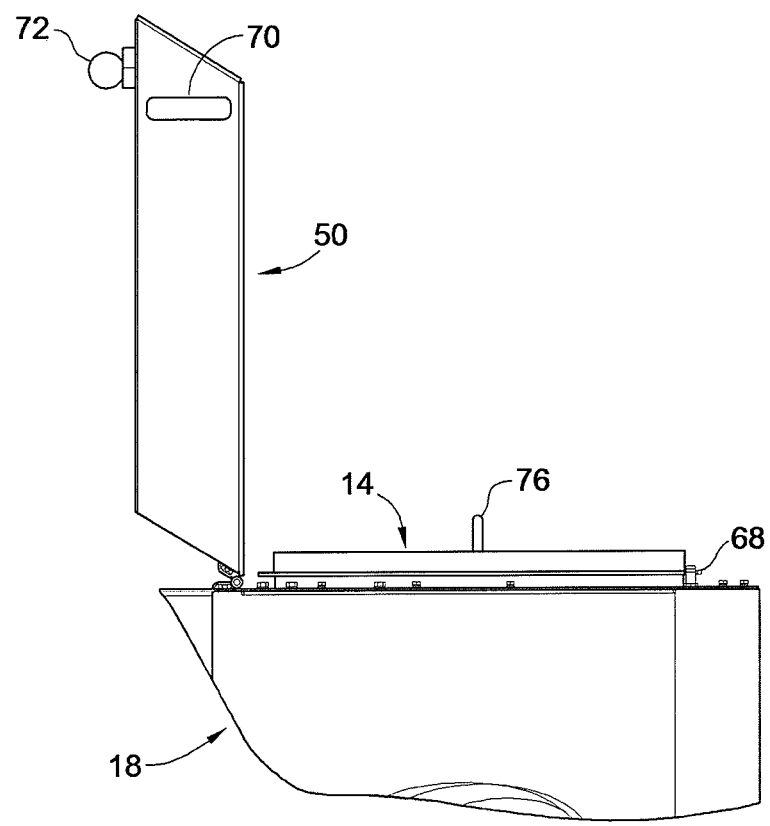
FIG. 6 is a side view of a portion of the portable air cleaner assembly with the access hatch lifted open and the filter element partially lifted.
Figure 7:
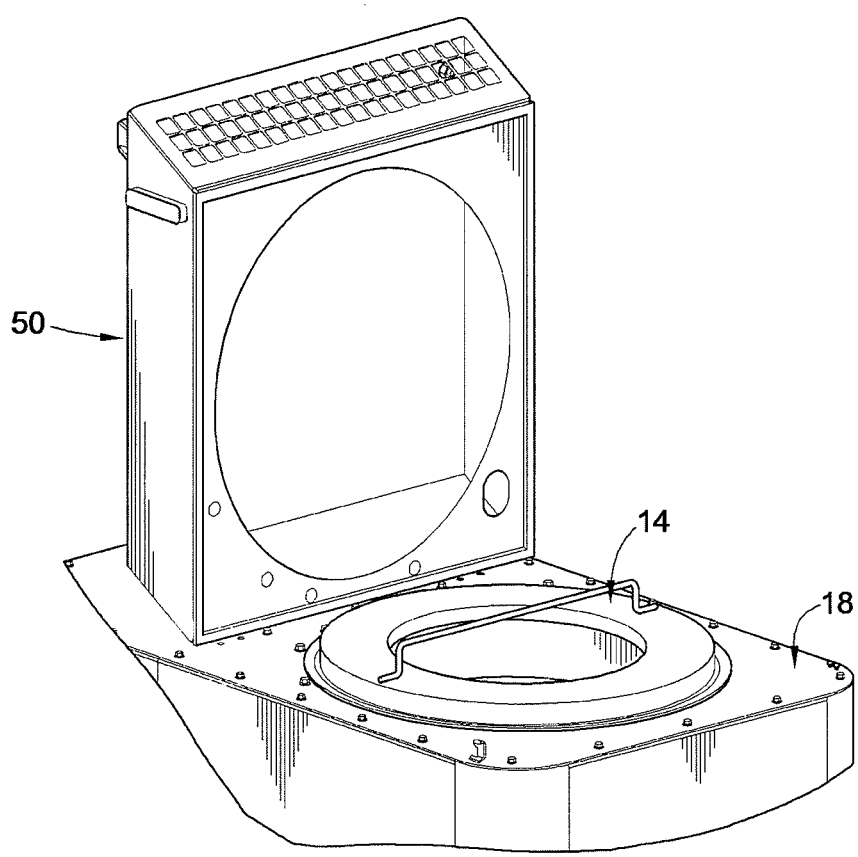
FIG. 7 is an isometric view of the portable air cleaner assembly similar to FIG. 5 except that the filter element 14 is resting and supported upon the top panel of the dust collection bin.

To secure the filter element 14 is in place and ensure appropriate sealing, an access hatch 50 is provided that covers and engages the top end of the filter element 14. The hatch 50 is also used to direct the air stream once it is passed through the filter and directs it out through a selected side of the portable air cleaner assembly. Preferably, the walls of the dust collection bin and the walls of the hatch 50 are made from sheet metal material which is formed and secured together as illustrated. As shown, the hatch includes a generally box-like structure and more particularly as shown in cross section takes the form of a parallelogram to include a top panel 52, a bottom panel 54 generally parallel with the top panel, two parallel side panels 56 that are also arranged generally perpendicular to the top and bottom panels, and two front and back end panels 58 and 60. The panels may be separately formed or as shown multiple panels may be formed from a common sheet of sheet steel and simply bent at corners to provide the different panels. The front and back end panels 58, 60 may be generally parallel and preferably as shown are set at oblique angles relative to the top and bottom panels 52, 54. A pair of hinges 62 secure the back end panel 60 to the top panel 44 of the dust collection bin. The hinges 62 permit rotation and pivoting movement of the hatch 50 at least and preferably just greater than 90° between a closed position as illustrated in FIGS. 1-4 and an open position as shown in FIGS. 5-7. As shown best in FIG. 2, the front end panel 58 includes a perforated region 64 to provide for the air outlet which returns filtered clean air back to the localized environment.

To maintain the hatch 50 in a closed and engaged position and to provide a positive axial squeeze force upon the top end of the filter element 14 to provide a positive axial sealing force, a latching mechanism is provided. Specifically, the latching mechanism includes draw latch clasps 68 and draw latches 70 arranged on opposed sides. Preferably and as shown, the draw latches 70 are arranged on the opposed side panels 56 and the latch clasps 68 are mounted to the top panel 44 of the dust collection bin. The draw latches 70 include a spring or other resilient device that facilitates tightening and a positive force when in a clamped position with the latch clasps 68. A handle 72 may optionally be mounted to the top panel 52 of the hatch 50 to facilitate opening and closure of the access hatch 50 manually by a technician.

The hatch and latching arrangement is advantageous in that it allows for simple and quick accessing of the filter when necessary whether it be for removal and replacement of a filter element or whether it be for inspection and/or quick access for receiving a compressed air line which may be manually received within the filter element and blown while the blower unit 30 is off so that compressed air applied from the clean slide can dislodge the collected dust cake from the filter surface on the other side of the filter element. This may temporarily extend filter life. Additionally, the weight of the filter element 14 is sufficient to maintain the axial seal in such instance while the hatch 50 is opened as the full weight of the filter element 14 bears down upon the seal to provide a sealing force.

To facilitate access, the draw latches 70 on either side of the hatch 50 are released and the hatch 50 is pivoted over 90° to insure that the path to remove the filter element is clear. Once the hatch is opened the user can grab the filter element 14 such as by way of a filter element handle 76 that is integrally provided or alternatively attached to the top end cap of the filter element 14 so that the user can pull the filter from the filter device. The user is never required to touch the filter surface where harmful dust may have accumulated during usage. After the filter element 14 has been removed, a replacement filter can be quickly inserted back through the top panel 44. Once the sealing hatch has been engaged, the unit is ready for continued normal operation.

To accommodate the top end of the filter element 14, the bottom panel 54 includes a circular opening 80 that is concentric relative to the circular opening 42 formed in the top panel 44 of the dust collection bin 18. The top end of the filter element 14 is received and projects up through the circular opening 80 in the hatch as illustrated. Preferably, the bottom panel 54 also includes a rectangular gasket 82 that to cushion the impact as the access hatch 50 is opened and closed. The rectangular gasket 82 can be made from suitable elastomeric material. In some embodiments, a hatch may be formed of a suitable plastic material, for example, a hatch in FIG. 8, which does not include a separate gasket for cushioning.

Turning to further detail of the filter element 14, the filter element generally includes a cylindrical ring of filter media 90 and top and bottom end caps 92, 94. The top end cap 92 features a filter element handle 76 to facilitate easy removal and installation. Preferably, the filter element also utilizes a protective cage such as an expanded metal wrapper around the perimeter of the ring of filter media 90 and extending between the top and bottom end caps 92, 94 to prevent damage to the filter element when it is being inserted or removed from the filter device. Typically, the opposed axial edges of the cage will be potted in the end caps.

Because such portable air cleaner assemblies 10 are utilized quite heavily, it is desirable that the filter element can be readily manipulated manually. However the filter element 14 needs to provide sufficient filtration capacity given the heavy industrial usage and to minimize down time for filter maintenance intervals. Accordingly, typically, the filter element will be between 1 and 4 feet tall; between 20 and 120 pounds (more typically between 45 and 80 lbs); and a diameter of between about 10 and 30 inches. For example, a filter element may have a 20 inch diameter and weigh about 60 pounds with 480 square feet of media that is pleated with a 3 inch pleat depth. Pleat depth will typically be in the range of between 2 and 4 inches and the amount of media would typically be between 200 and 1,000 square feet of media. A suitable filter media comprises a pleated filter paper media, which may also be a composite media to include a high efficiency fine fiber layer that is laid down upon one of the faces of the filtration media.

Figure 14:
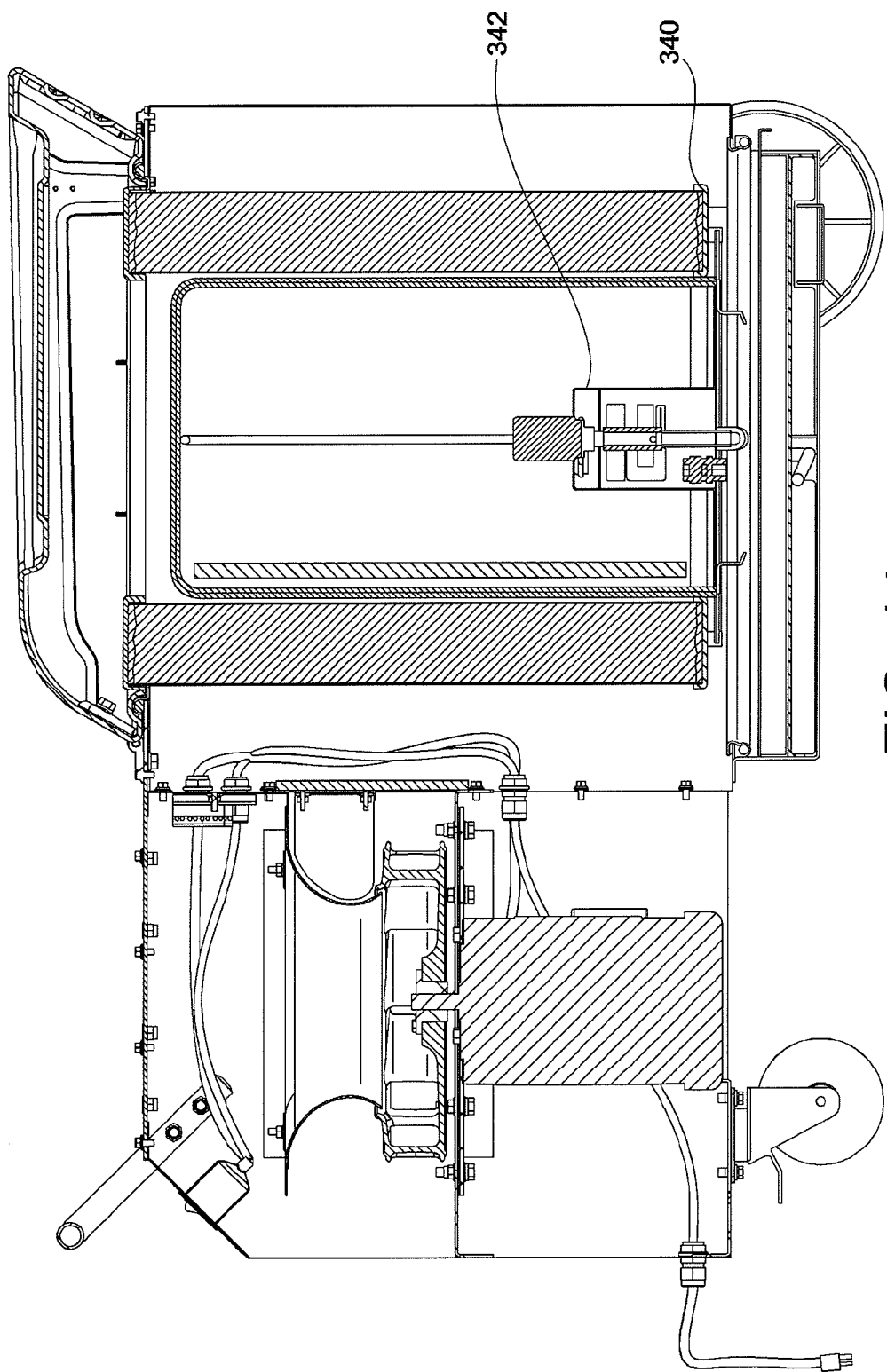
FIG. 14 is a cross sectional view of a portable air cleaner assembly according to an embodiment of the present invention having an open bottom end cap.

Considering that there is some sizable weight due to the heavy filtration needs, suitable mounting structure is provided. In accordance with an aspect of the present invention, the present embodiment provides this through the top end cap 92. As can be seen, the top end cap has a central opening that provides a clean air outlet port 96 therethrough. Further, the top end cap 92 also supports the entire weight of the overall filter element 14 as it rests upon the dust collection bin 18. Accordingly, the top end cap provides a sole support structure for carrying the entire weight and load of the overall filter element 14. To facilitate this, the top end cap 92 is adequately bonded to the top end of the filter media 90 such as through plastisol or any other suitable adhesive which may be contained within an annular well region 98 defined by the top end cap 92 (or alternatively the top end of the filter media can be directly embedded in the material of the end cap such as may be the case with a plastic molded end cap embodiment). Similarly, the bottom end cap 94 may also include a well region 100, for receiving suitable adhesive for bonding and closing off the bottom end of the filter media 90. As illustrated, the bottom end cap 94 is closed to prevent fluid flow through the bottom end cap. Alternatively, a bottom end cap 340 may be open, as shown in FIG. 14, wherein a self cleaning system 342 may be mounted.

Each of the end caps 92, 94 are sealingly attached to the top and bottom ends of the filter media 90, to prevent short circuiting of unfiltered air past the filter media. Referring in greater detail to the top end cap 92, this structure includes, as best shown in FIGS. 3 and 4, a disc portion 102 with an inner annular wall 104 and an outer annular wall 106 integral therewith. Projecting radially outward from the outer annular wall 106 is an annular flange 108 that is integral with the annular wall 106 and in surrounding relation thereto. A circular gasket 110 is fitted or molded onto this annular flange 108 and provides an axial sealing portion 112 along the bottom side that sealingly engages along a circular interface with the top panel 44 of the dust collection bin 18. Considering frequent change intervals, the gasket is carried and provided by the filter element, so as to prevent fatigue in the seal in the event it was only provided on the housing. Preferably, the circular gasket 110 also includes an engagement and cushion portion 114 along the top side of the annular flange 108 which engages with the bottom panel 54 of the access hatch 50. Sealing portions 112, 114 are preferably connected by an annular connection portion 116 that circumscribes and covers the outer edge of the annular flange 108. The gasket 110 may be provided as a slitted slip gasket that can be stretched and fitted onto the flange 108 or alternatively may be molded thereon directly.

The top end cap 92 may either be made of metal material or plastic material, or other suitable material. While similar gauges or can be used, for cost efficiency and weight reasons, the top end cap 92 can be and will typically be of a different gauge and a much heavier gauge then the bottom end cap 94, due to the supporting function of the top end cap. The top end cap typically is formed, for example, from sufficiently heavy gauge metal material or as a plastic molded component. In either event, it is sufficient to carry moment loads that occur and/or are carried through the annular flange 108 and the outer annular wall 106, without any substantial bending of these regions that would affect sealing function (e.g. a seal can be provided simply by the weight of the filter element such as when the access hatch is open). As can be seen, the filter element 14 is situated upright with a top end 118 projecting through the openings 42 and 80 in the dust collection bin 18 and access hatch 50.

Figure 8:
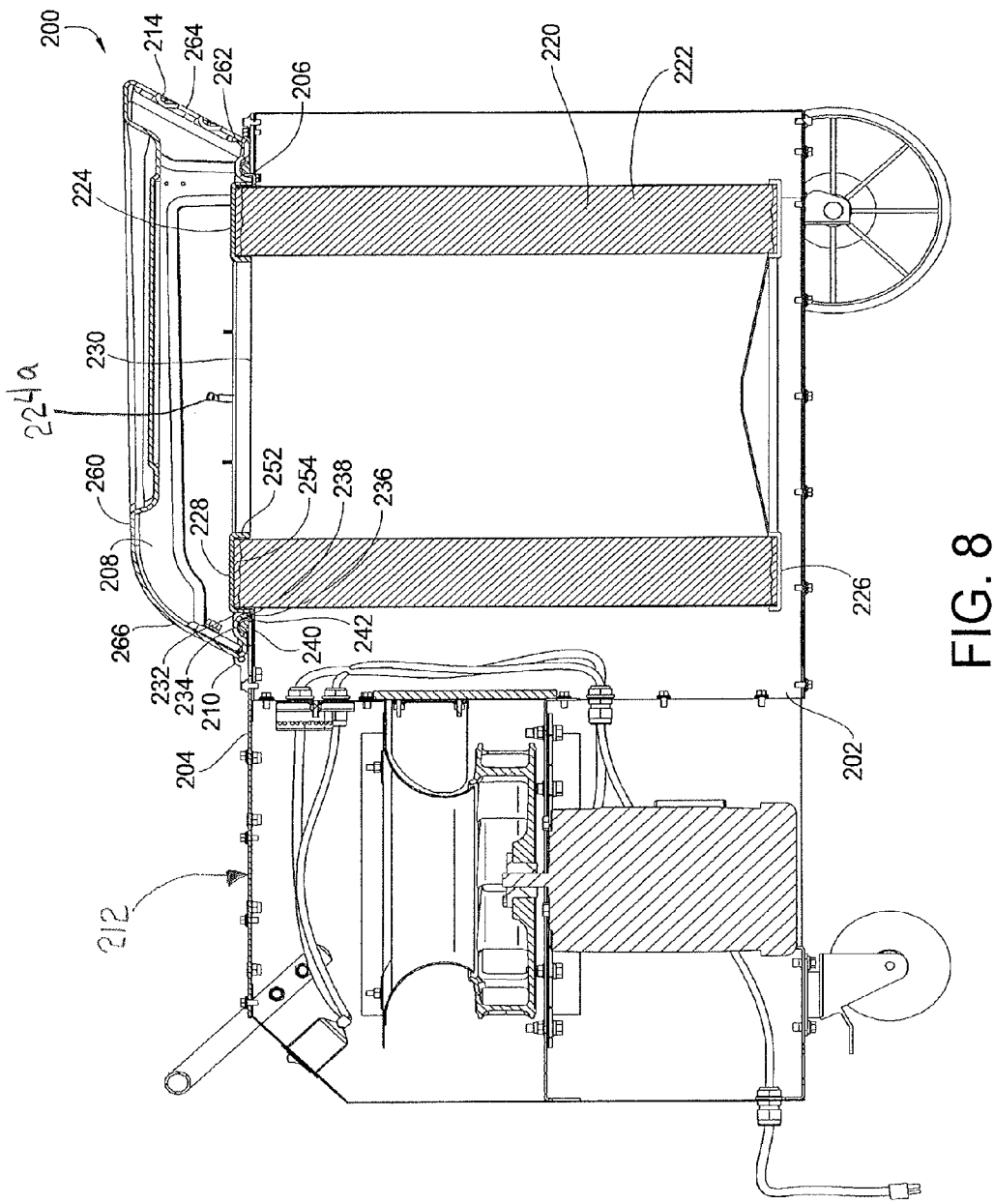
FIG. 8 is a cross sectional view of a portable air cleaner assembly according to a different embodiment of the present invention with the air cleaner assembly being shown in a partial cross sectional view including a filter element.
Figure 9:
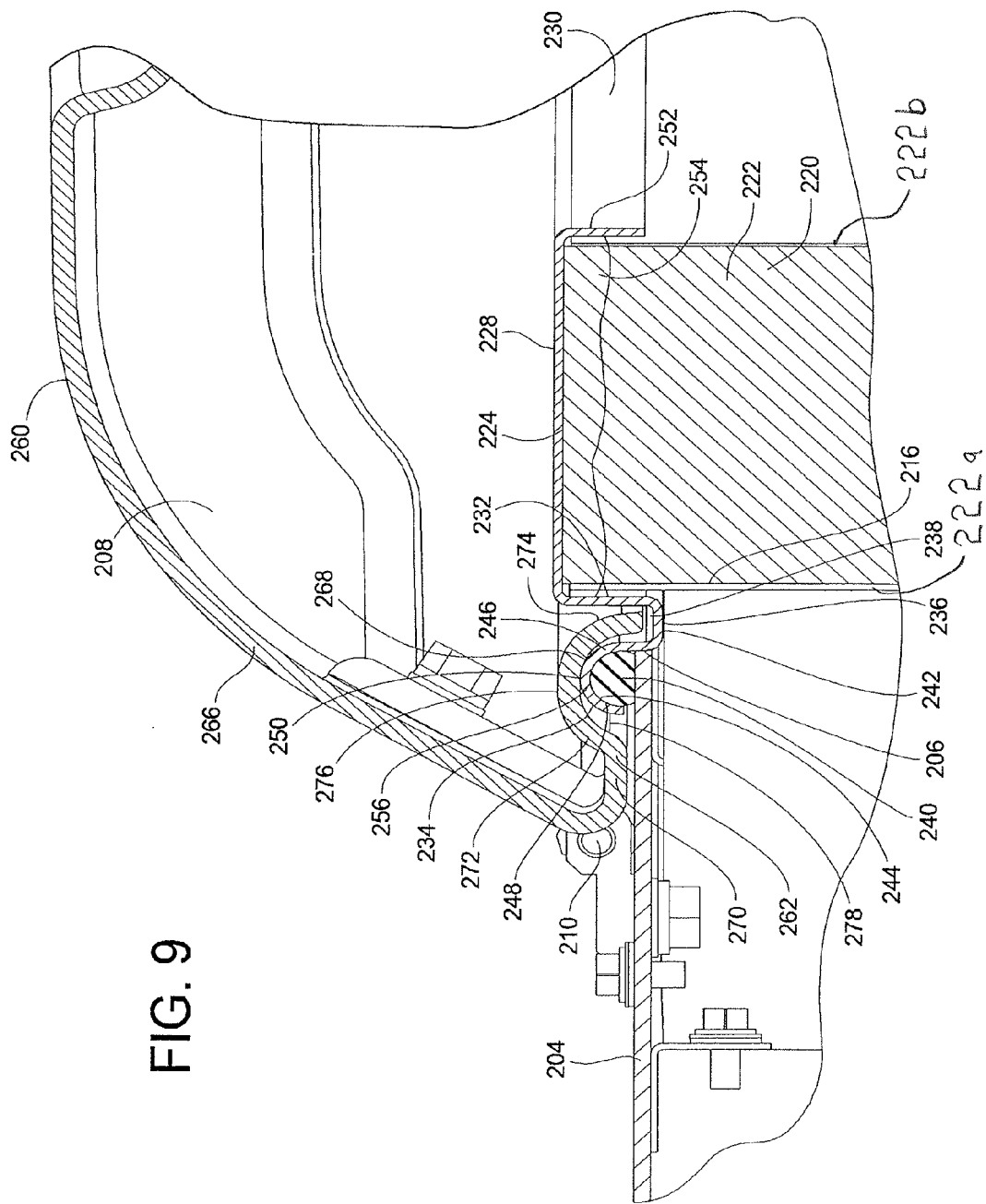
FIG. 9 is an enlarged view of a portion of FIG. 8 to better illustrate a sealing engagement between the filter element, a top panel of the dust collection bin and an access hatch.

FIGS. 8 and 9 show an air cleaner assembly 200 according to a different embodiment of the present invention. Although this embodiment is described as an air cleaner assembly, an end cap interface feature employed in this embodiment can also be used in other filtration applications. As it was with the air cleaner assembly 10 of FIGS. 1-7, the air cleaner assembly 200 is designed as a portable unit and includes a particulate collection bin 202, an access hatch 208 and a filter element 220. The air cleaner assembly 200 also includes an air inlet 212 for receipt of a particulate laden air stream and an air outlet 214 located in the access hatch 208 for directing the filtered air out through a selected side of the portable air cleaner assembly. Although the most of components of the air cleaner assembly 200 is similarly configured as the air cleaner assembly 10, the air cleaner assembly 200 includes an improved end cap interface between the filter element 220 and the hatch 208 to provide a superior sealing arrangement of the filter element 220 during air cleaner assembly operation, and/or to provide improved strength, and/or for other reasons.

As shown in FIG. 8, the filter element 220 is placed in an opening 206 formed on a top panel 204 of the particulate collection bin 202. The filter element 220 includes a cylindrical ring of filter media 222 with the top end cap 224 and a bottom end cap 226 enclosing the top and bottom ends of the filter media 222. Preferably, the filter element 220 includes a protective cage 222a (see also e.g. cage 380 in FIG. 13 embodiment) such as an expanded metal wrapper around the perimeter of the filter media 222 and extending between the top and bottom end caps 224, 226 to prevent damage to the filter element 220 when it is being inserted or removed from the air cleaner assembly 200. The filter element 220 may also include an optional inner liner/wrapper 222b (see also e.g. liner 382 in FIG. 13 embodiment) for support.

Figure 10:
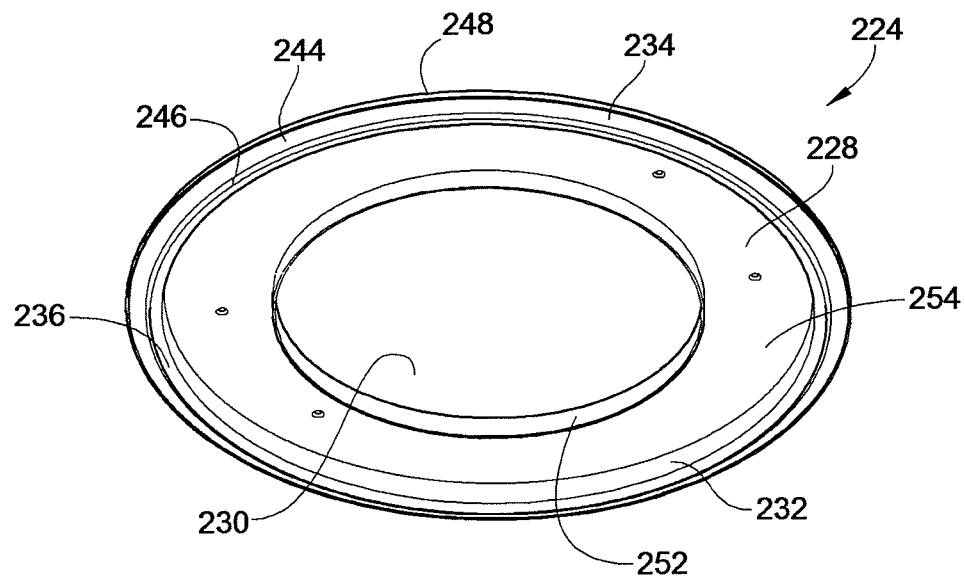
FIG. 10 is a perspective view of a top end cap of the filter element of FIG. 9.
Figure 11:
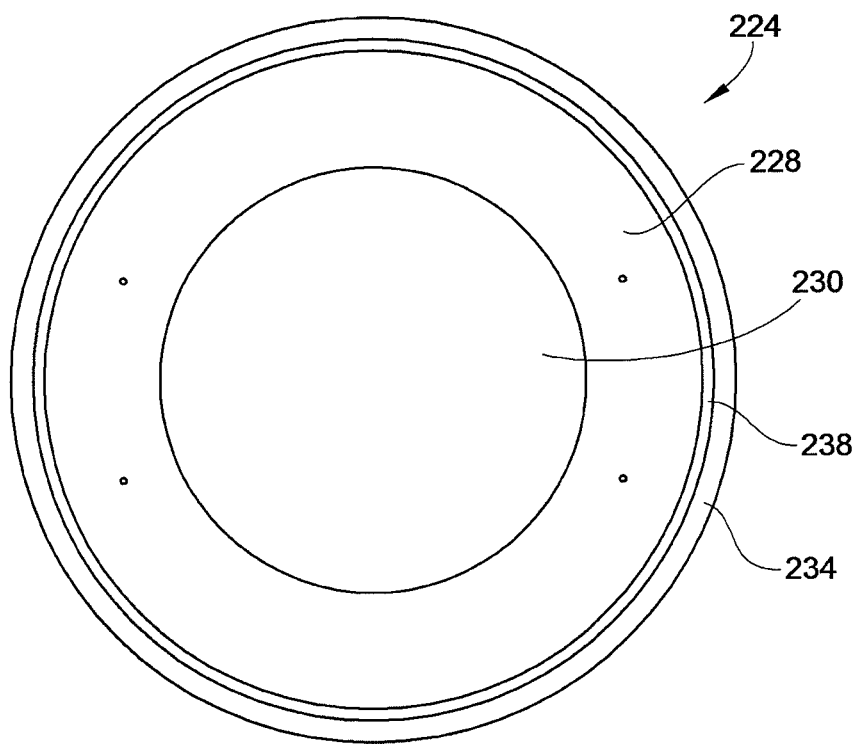
FIG. 11 is a top view of the top end cap of FIG. 10.

As it was with the previous embodiment, the top end cap 224 may include a handle 224a to facilitate easy installation and removal. As shown in FIGS. 9-11, the top end cap 224 includes an annular disc portion 228, an inner peripheral wall 252, and an outer peripheral wall 232 defining a generally u-shape annular well region 254 wherein the top end of the cylindrical ring of the filter media 222 is received and sealingly attached. To support the weight of the filter element 220, the top end cap 224 is adequately bonded to the top end of the filter media 222 using a suitable adhesive, which may be contained within the annular well region 254. For example, a plastisol or a urethane material may be filled in the annular well region 254, followed by insertion of the filter media 222. Alternatively, the top cap 224 may be plastic molded or thermally embedded directly into the top end of the filter media 222 to sealingly attach and bond. Similarly, the bottom end cap 226 is sealingly attached to the bottom end of the filet media 222. In this embodiment, the weight of the filter element 220 is supported by the top end cap 224, thus the bonding between the top end cap 224 and the top end of the filter media 222 is designed to adequately support the weight of the filter media 222. Although the bottom end cap 226 may be attached using a same adhesive/method as the top end cap 224, the bottom end cap 226 may also be attached having a less bonding strength than the top end cap 224 and of a thinner gauge material proving cost savings, since the entire weight of the filter element 220 is support by the top end cap 224 in this embodiment.

The top end cap 224 further includes an annular disc segment 242 generally parallel with the annular disc portion 228. The annular disc segment 242 and the annular disc portion 228 are connected and axially spaced by the outer peripheral wall 232. The top end cap 224 also includes an annular seal support 234 spaced radially from the outer peripheral wall 232 by a radial spacer wall 236 formed by the annular seal disc segment 242. An annular receiving channel 238 is defined between the outer peripheral wall 232 and the annular seal support 234. As shown in FIGS. 8-11, the annular well region 254 and the annular receiving channel 238 are formed to face opposite axial directions.

The annular seal support 234 is defined by an inner annular extension 246 and an outer terminating flange 248, connected at an apex 250, wherein an annular groove 244 is formed. As shown, the annular groove 244 is formed to face the same axial direction as the annular well region 254 and opposite axial direction of the annular receiving channel 238. The annular groove 244 is configured to carry an annular seal member 240, wherein the apex 250 defines a groove bottom. The inner annular extension 246 extends between the annular disc segment 242 and the apex 250 and has a greater axial length than an axial depth of the annular seal member 240. The outer terminating flange has a shorter axial length than the axial depth of the annular seal member 240. As such, the annular seal member 240 as seated in the annular groove 244 extends axially from the apex 250 past the outer terminating flange 248 to provide a free compressible portion of the annular seal member 240, which provides an annular axial seal between the filter element 220 and the top panel 204 of the air cleaner assembly 200 during operation. Preferably, the annular seal member 240 is not unitary with the annular seal support 234. That is, the annular seal member 240 is a separate annular gasket formed of a suitable resilient elastomeric material.

The outer surface of the annular seal support 234 on a side opposite from the annual groove 244 defines a cam surface 256. The cam surface 256 provides means for radially locating and axially loading the annular seal member 240 when employed in operation. Specifically, by having a cam surface that is oblique relative to a central axis (same as installation axis), engagement with the housing cover or lid moves and positions the filter element accurately relative to the housing to concentrically align the filter element for proper sealing position and loading.

In one embodiment, the filter element 220 is configured to have an outer diameter between 2" and 30", preferably between 18" and 25". The filter element 220 may weigh between 1 lb. and 50 lbs., preferably between 1 lb. and 30 lbs. As discussed above, the filter element 220 is placed in the particulate collection bin 202, wherein the annular seal member 240 in the annular seal support 234 of the top end cap 224 is placed against the top panel 204, supporting the entire weight of the filter element 220. The annular receiving channel has an axial depth, measured from a top exterior surface of the annular disc portion 228 to a bottom of the annular receiving channel 238, between 1/8" and 2", preferably between 1/4" and 1"; a width, measured by a radial length of the annular disc segment 242, between 1/16" and 1", preferably between 1/16" and 2". The inner annular extension 246 of the annular seal support 234 has an axial extension between 1/8" and 2", preferably between 1/4" and 1/2". The outer terminating flange 248 of the annular seal support 234 has an axial extension between 1/16" and 2", preferably between 1/16" and 1/2". The annular seal support 234 has a width, measured by a distance between the tip of the outer terminating flange 248 to a point on the inner annular extension 246 on a radial axis parallel to the top panel 204, between 1/16" and 1", preferably between 3/8" and 5/8". The top end cap 224 and the bottom end cap 226 may be formed of a metal via a suitable metal forming process such as metal spinning or stamping. Alternatively, the end caps may be formed of other suitable materials such as plastic or aluminum. The annular seal member 240 can be formed of a suitable elastomeric material such as EPDM having hardness property between Shore A 10 to Shore A 80 preferably between Shore A 30 and Shore A 50.

As shown in FIGS. 8 and 9, the filter element 220 is placed in the opening 206 formed in the top panel 204, such that the annular receiving channel 238 of the top end cap 226 is in the opening 206, and a lower portion of the inner annular extension 246, proximate where the inner annular extension 246 is joined with the annular disc segment 242, abuts the opening 206 with a minimal clearance between them. When the filter element 220 is placed in the opening 206, the annular seal member 240 seats on the top panel 204 proximate the opening 206. As such, the top end cap 224 is mounted in a suspended orientation, wherein the annular receiving channel 238 defined by the inner annular extension 246, the annular disc segment 242 and the outer peripheral wall 232 is partially suspended below the top panel 204, between the top panel 204 and the filter media 222, thereby preventing radial shift of the filter element 220 within the opening 206 and protecting the filter media 222 from any damages that may result from radial shifts of the filter element 220. Such suspended mounting of the filter media element 220 improves alignment of the filter element 220 in the particulate collection bin 202.

To secure the filter element 220 in place and ensure appropriate sealing, the access hatch 208 is engaged with a top end cap 224 of the filter element 220 as shown in FIG. 9. The hatch 208 has a generally box-like structure including a top panel 260, a bottom panel 262, a front panel 264, a back panel 266 and two side panels. The top panel 260 and the bottom panel 262 are generally parallel to each other. Similarly, the front panel 264 and the back panel 266 are generally parallel to each other. The side panels are also arranged parallel to each other and generally perpendicular to the top and bottom panels 260, 262 and front and back panels 264, 266. The front and back end panels 264, 266 are preferably, as shown, set at oblique angles relative to the top and bottom panels 260, 262.

A pair of hinges 210 secure the back panel 266 to the top panel 204 of the particulate collection bin 202. The hinges 210 permit rotation and pivoting movement of the hatch 208 at least and preferably just greater than 90° between a closed position and an open position as it was with the previous embodiment. The air outlet 214 is formed in the front panel 264 of the hatch 208.

The bottom panel 262 of the hatch 208 includes an opening, wherein the top end of the filter element 220 projects up through when the hatch 208 is in the closed position. The bottom panel 262 also includes an annular disc portion 270, which extends radially from the back panel 266, and an annular loading and positioning portion 268. The annular loading and positioning portion 268 is defined by an inner extension 272 and an outer terminal flange 274, and radially spaced from the back panel 266 by the annular disc portion 270. The inner extension 272 and the outer terminal flange 274 are connected at an apex 276, wherein the apex 276 forms the bottom of a groove 278 formed therein. The inner extension 272 is radiused and extends between the annular disc portion 270 and the apex 276. The outer terminal flange 274 is also radiused and has a longer axial extension than the inner extension 272. The annular loading and positioning portion 268 is configured such that when the hatch 210 is in the closed position as shown in FIG. 9, an axial distance from the bottom of the groove 278 at the apex 276 to the top panel 204 of the particulate collection bin 202 is slightly greater than an axial distance from the cam surface 256 of the annular seal support 234 at the apex 250 to the top panel 204.

After the filter element 220 is placed in the particulate collection bin 202, as described above, the hatch 208 is closed to cover the top of the filter element and to provide a positive axial squeeze force upon the annular seal member 240. As the hatch 208 is closed, the cam surface 256 of the top end cap 224 guides the annular loading and positioning portion 268 radially to align and engage the hatch 208 with the top end cap 224. That is, the outer terminal flange 274 of the annular loading and positioning portion 268 is guided by the cam surface 256, such that the outer terminal flange 274 is positioned in the annular receiving channel 238 when the hatch 208 is in the closed position. Once the outer terminal flange 274 is in the annular receiving channel 238, the annular loading and positioning portion 268 is positioned over the annular seal support 234, such that the annular seal support 234 is enclosed within the groove 278 of the annular loading and positioning portion 268. In the such closed position, the bottom of the groove 278 seats approximately about the apex 250 of the annular seal support 234, applying axial force on the annular seal member 240. The outer terminal flange 274 positioned in the annular receiving channel 238 provides a locking feature, wherein a radial movement of the filter element 220 is restricted by the inner annular extension 246 of the annular receiving channel 238 and the outer terminal flange 274 of the annular loading and positioning portion 268 arranged against each other.

When the hatch 208 and the top end cap 224 are engaged in the closed position as discussed above, the annular loading and positioning portion 268 is positioned on the top of the annular seal support 234, such that the apex 276 of the annular loading and positioning portion 268 and the apex 250 of the annular seal support 234 are generally aligned axially on top of each other. As such, an axial loading applied on filter element 220 by the hatch 208 is directed to the annular seal member 240. As such, sealing between the filter element 220 and the particulate collection bin 202 of this embodiment is improved by focusing the axial compressive force on the annular seal member 240.

To maintain the hatch 208 in a closed and engaged position to provide a positive axial squeeze force upon the annular seal member 240, a latching mechanism similar to one described in the previous embodiment may be provided here.

Although the filter element 220 of this embodiment is used in the portable air cleaner assembly 200, the filter element 220 may also be used in other applications such as a liquid filter in canisters and an engine filter.

Figure 12:
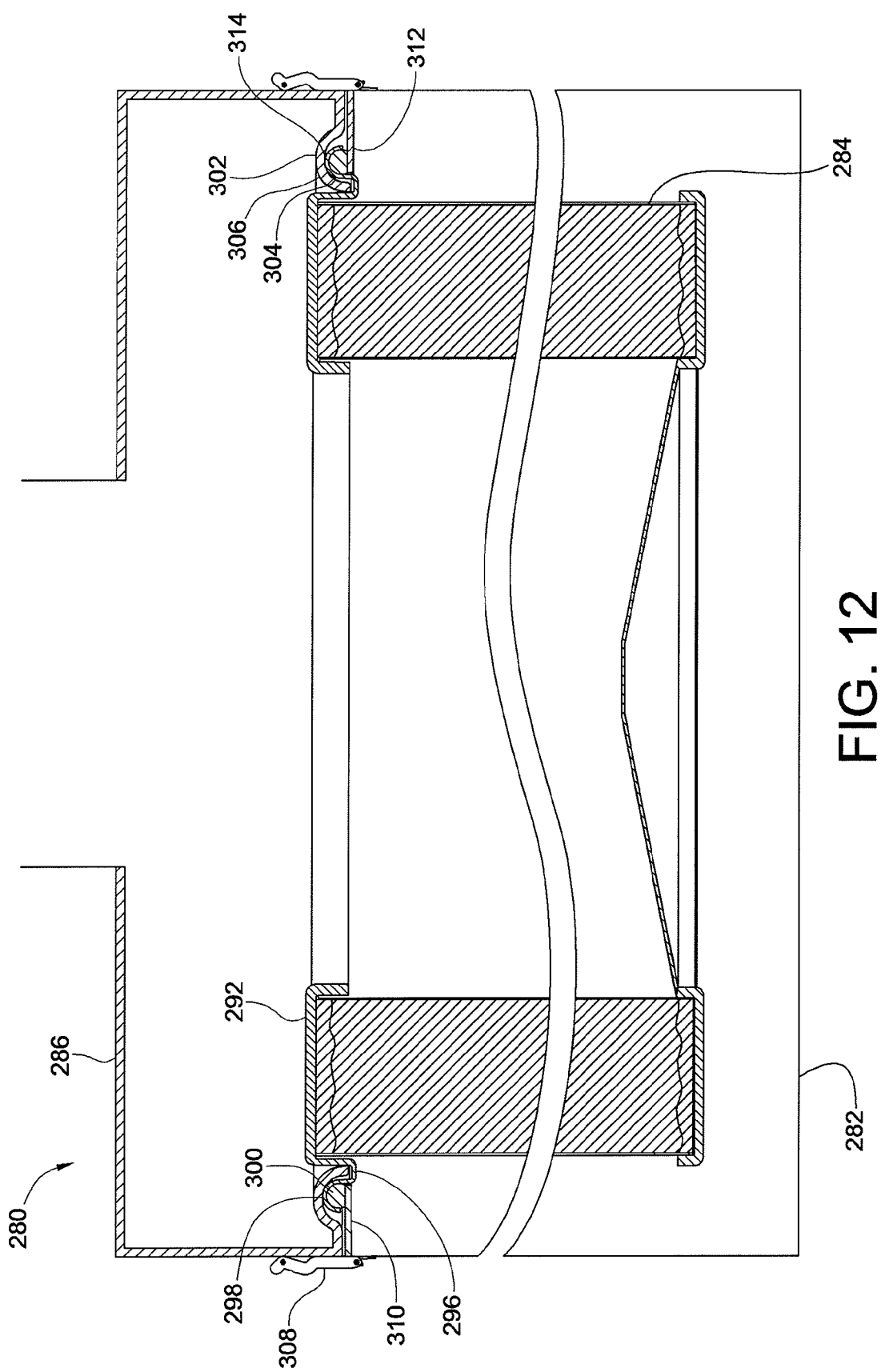
FIG. 12 is a cross sectional view of a filter element mounted in a filter housing according to yet another embodiment of the present invention.

FIG. 12 illustrates a filter assembly 280 according to a different embodiment of the present invention. The filter assembly 280 includes a filter housing 282, a filter element 284 and a cover 286. As it was with the filter element 220 of the previous embodiment, the filter element 284 includes a top end cap 288 and a bottom end cap 290 attached to top and bottom ends of the filter media 283. "Top" and "bottom" herein refer to typical two ends of a filter media, thus a filter element arranged in a horizontal orientation still includes "top" and "bottom" ends. Therefore, a filter element does not necessarily require vertical orientation. The top end cap 288 is similarly configured as the top end cap 224 including an annular disc portion 292, an outer peripheral wall 294, a radial spacer wall 296 and an annular seal support 298, wherein an annular seal member 300 is seated.

The cover 286 is similarly configured as the hatch 208 including an annular seal load member 302 defining a groove 306 and having a terminating flange 306. In this embodiment, the cover 286 is not permanently attached to the filter housing 282 as it was with the hatch 208 of the previous embodiment. The cover 286 can be completely removed away from the filter housing 282 for mounting of the filter element 284, and place back on the filter housing 282 after the filter element 284 is mounted, then attached by closing a latch 308. In other embodiments, the cover 286 may be permanently attached to the housing via a hinge.

The filter element 284 of this embodiment is mounted horizontally in the filter housing 282. For insertion and removal of the filter element 284, the latch 308 is opened and the cover 286 is removed away from the filter housing 282 for easy movement of the filter element 284. The filter element 284 is inserted into an opening defined by a mounting panel 310 of the filter housing 282 horizontally, such that the bottom end cap 290 enters the opening of the filter housing 282 first. Then, the filter element 284 is pushed into the opening until the annular seal member 300 is mounted against an annular sealing surface 312 surrounding the opening.

Once the filter element 284 is mounted in the filter housing 282, the cover 286 is placed on the filter housing 282. Here, a cam surface 314 of the annular seal support 298 guides the placement of the annular seal load member 302, similarly as described with regard to the cam surface 256 of the previous embodiment. When the cover 286 is properly placed on the filter housing 282, the annular seal support 298 is arranged in the groove 304 such that at least some portion of the annular seal load member 302 is resting on a portion of the cam surface 314. Then, the latch 308 is closed, providing a squeeze force, thereby applying a load on the annular seal member 300 to secure and seal the filter element 284 in the filter housing 282.

Figure 13:
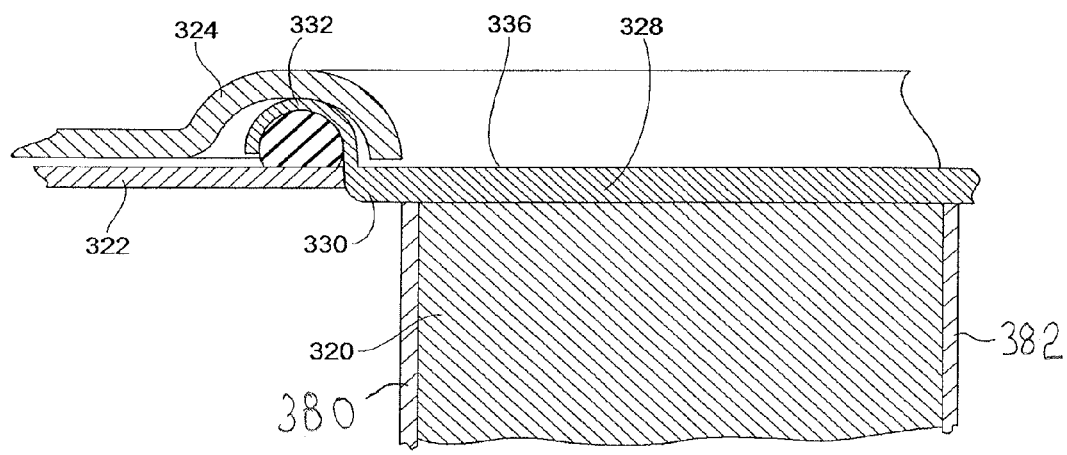
FIG. 13 is a partial cross sectional view of a filter element mounted on a mounting panel of a filter housing, engaged with a seal loading member of a cover according to another embodiment of the present invention.

FIG. 13 illustrates a filter element 320 mounted on a mounting panel 322 of a filter assembly (not shown), engaged with an annular seal load member 324 of a cover (not shown) according to yet another embodiment of the present invention. The filter element 320 is configured the same as the filter elements 220, 284 of previous embodiments, except a top end cap 326. The top end cap 326 includes an annular disc portion 328, a radial spacer wall 330 and a annular seal support 332.

The radial spacer wall 330 is integral with the annular disc portion 328, spacing the annular seal support 332 radially outward from the tubular ring of filter media 334. That is, the radial spacer wall 330 linearly extends radially outward from the annular disc portion 328, such that the radial spacer wall 330 and the annular disc portion 328 provide a generally flat top surface 336. The annular seal support 332 projects from the radial spacer wall 330, such that the annular seal support 332 is axially above and radially outward from the generally flat top surface 336 defined by the annular disc portion 328 and the radial spacer wall 330. The top end of the filter media 334 is embedded in the annular disc portion via a suitable process such as plastic molding. As shown, the filter element 320 is mounted in the housing such that the radial spacer wall 330 is arranged against the mounting panel 322.

In other embodiments, the bottom end cap 226 may be configured such that the filter element 220 may be mounted horizontally, wherein the top end cap and the bottom end cap equally support the weight of the filter element 220 against support structures of a filter housing.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element for a housing having a mounting panel defining an opening and having an annular sealing surface surrounding the opening, further including a cover having an annular seal load member defining an groove with a terminating flange projecting toward the opening in a closed position, the filter element comprising:
    a tubular ring of filter media sized to be received through said opening;
    a bottom end cap sealingly bonded to a bottom end of the tubular ring of filter media;
    a top end cap, the top end cap including:
        an annular disc portion having a central opening, the annular disc portion sealingly bonded to a top end of the tubular ring of filter media;
        an annular seal support; and
        a radial spacer wall integral with the annular disc portion spacing the annular seal support radially outward from the tubular ring of filter media, the annular seal support projecting from the radial spacer wall in a direction opposite the bottom end cap, wherein a clearance space is provided adapted to receive the terminating flange; and
    an annular seal member carried by the annular seal support and adapted to seal against the annular sealing surface.

2. The filter element of claim 1, wherein the top end cap further includes an outer peripheral wall extending axially from the annular disc portion toward the bottom end, wherein the radial spacer wall extends radially outward to radially space the annular seal support from the outer peripheral wall; wherein the annular disc portion, the outer peripheral wall, the radial spacer wall and the annular seal support are a single integral piece.

3. The filter element of claim 2, wherein an annular receiving channel is defined between the outer peripheral wall and the annular seal support, wherein the terminal flange is received in the closed position.

4. The filter element of claim 1, wherein the annular seal support defines an annular groove facing the annular sealing surface when mounted in the housing, the annular seal member being not unitary with the end cap, but a separate elastomeric annular gasket seated in the annular groove.

5. The filter element of claim 4, wherein the annular seal support includes an inner annular extension and an outer terminating flange connected at an apex which form a groove bottom for the annular groove, the inner annular extension extending axially between the radial spacer wall and the apex and having a greater axial length than an axial depth of the annular seal member; and wherein the annular seal projects axially from the apex past the outer terminating flange to provide a free compressible portion of resilient material that provides an annular axial seal.

6. The filter element of claim 5, wherein the annular seal support has a cam surface defined on a side opposite of the annular seal member, the cam surface providing means for radially locating and axially loading the seal member with the annular seal load member.

7. The filter element of claim 6, wherein the annular seal load member and the annular seal support are engaged in the closed position, wherein the cam surface guides the annular seal load member, such that the annular seal support is placed in the groove of the annular seal load member, wherein the terminal flange of the annular seal load member is arranged against the inner annular extension, locking the filter element in a position.

8. The filter element of claim 1, wherein the filter element is mounted in the housing vertically, wherein the annular seal member of the top end cap rests on the mounting panel, wherein the annular seal member is configured to support the filter element against the mounting panel.

9. The filter element of claim 1, wherein the filter element is mounted in the housing horizontally, wherein the top end cap is configured to seat against the mounting panel, supporting the filter element.

10. The filter element of claim 1, wherein the radial spacer wall is an linear extension extending radially outward from the annular disc portion such that the radial spacer wall and the annular disc portion provide a generally flat top surface, and the annular seal support projecting from the radial spacer wall such that the annular seal support is axially above and radially outward from the generally flat top surface.

11. The filter element of claim 10, wherein the annular disc portion, the radial spacer wall and the annular seal support are a single integral piece, wherein the top end of the tubular ring of filter media is embedded into the annular disc portion.

12. A filter element, comprising:
a tubular ring of filter media;
a bottom end cap sealingly bonded to a bottom end of the tubular ring of filter media
a top end cap, the top end cap including:
an annular disc portion having a central opening, the annular disc portion sealingly bonded to a top end of the tubular ring of filter media;
an outer peripheral wall extending axially from the annular disc portion toward the bottom end cap;
an annular seal support; and
a radial spacer wall spacing the annular seal support radially outward from the outer peripheral wall to provide an annular receiving channel defined between the outer peripheral wall and the annular seal support; and
an annular seal member carried by the annular seal support.

13. The filter element of claim 12, wherein the radial spacer wall and the outer peripheral wall and the annular seal support are solid bodies free of apertures formed therethrough.

14. The filter element of claim 12, wherein the radial spacer wall comprises a generally flat annular disc segment.

15. The filter element of claim 12, wherein the annular seal support defines an annular groove facing in an opposite axial direction than the receiving channel, the annular seal member being not unitary with the top end cap, but separate elastomeric annular gasket seated in the annular groove.

16. The filter element of claim 15, wherein the annular seal support includes an inner annular extension and an outer terminating flange connected at an apex which form a groove bottom for the annular groove, the inner annular extension extending axially between the radial spacer wall and the apex and having a greater axial length than an axial depth of the annular seal member; and wherein the annular seal projects axially from the apex past the outer terminating flange to provide a free compressible portion of resilient material that provides an annular axial seal.

17. The filter element of claim 16, wherein the filter element is in combination with a filter housing, the filter element being mounted in a filter housing vertically, wherein the annular seal member of the top end cap rests on a support structure of the filter housing; wherein the annular seal member is configured to support the filter element.

18. The filter element of claim 16, wherein the filter element is in combination with a filter housing, the filter element being mounted in a filter housing horizontally, wherein the top end cap is configured to seat against a support structure of the filter housing, supporting the filter element.

19. The filter element of claim 16, wherein the receiving channel has a axial depth of at least 1/8 inches measured from an exterior surface of the disc portion to a bottom of the receiving channel.

20. The filter element of claim 12, wherein the seal support has a cam surface defined on a side opposite of the annular seal member, the cam surface providing means for radially locating and axially loading the seal member when employed in operation.

21. An air cleaner assembly, comprising:
a particulate collection bin having a top panel defining an opening;
a hatch arranged over the opening;
a filter element installed in the opening, the filter element including a ring of filter media, a top end cap and a bottom end cap mounted to opposed ends of the filter media, the top end cap comprising:
an annular disc portion having a central opening;
an outer peripheral wall extending axially from the annular disc portion;
an annular seal support;
a radial spacer wall spacing the annular seal support radially outward from the outer peripheral wall to provide an annular receiving channel defined between the outer peripheral wall and the annular seal support; and
an annular seal member carried by the annular seal support;
wherein the annular seal member rests upon and seals against the top panel around the opening.

22. The air cleaner assembly of claim 21, wherein the hatch includes a top wall and a bottom wall in spaced relation and a sidewall extending therebetween and connecting the top and bottom walls, the bottom wall defining a second opening, a top end of the filter element projecting up through the second opening when the hatch is in the closed position.

23. The air cleaner assembly of claim 22, wherein the second opening of the hatch is larger than the opening in the top panel and concentrically arranged in the closed position.

24. The air cleaner assembly of claim 22, wherein the annular seal support defines an annular groove facing in an opposite axial direction than the receiving channel, the annular seal member being seated in the annular groove.

25. The air cleaner assembly of claim 24, wherein the annular seal support includes an inner annular extension and an outer terminating flange connected at an apex which form a groove bottom for the annular groove, the inner annular extension extending axially between the radial spacer wall and the apex and having a greater axial length than an axial depth of the annular seal member; and wherein the annular seal projects axially from the apex past the outer terminating flange to provide a free compressible portion of resilient material that provides an annular axial seal.

26. The air cleaner assembly of claim 25, wherein the seal support has a cam surface defined on a side opposite of the annular seal member, the cam surface providing means for radially locating and axially loading the seal member when employed in operation.

27. The air cleaner assembly of claim 26, wherein the bottom wall of the hatch further includes an annular loading and positioning portion radially spaced from the side wall by a connecting portion, the annular loading and positioning portion comprising:
a second inner extension and a second terminal flange connected at a second apex, wherein a second groove is formed and the second apex defining a bottom of the second groove; the second inner extension extending between the connecting portion and the second apex and the second terminal flange extending from the second apex and having a greater axial length than the second inner extension.

28. The air cleaner assembly of claim 27, wherein the annular loading and positioning portion and the annular seal support are engaged in the closed position; wherein the cam surface guides the annular loading and positioning portion to place the second terminal flange into the annular receiving channel; wherein the second terminal flange is arranged against the inner annular extension, locking the filter element in a position.

29. The air cleaner assembly of claim 28, wherein the top end cap is configured to support and mount the filter element in a suspended orientation, wherein the annular receiving channel defined by the outer peripheral wall, the annular disc segment and the inner annular extension is partially suspended between the filter media and the top panel of the particulate collection bin; and the annular seal member in the annular seal support seats on the top panel proximate the opening.

30. The air cleaner assembly of claim 29, wherein the annular seal support is enclosed by the annular loading and positioning portion in the closed position, wherein the bottom of the second groove rests on the cam surface around the apex of the annular seal support, directing an axial force applied by the hatch to the annular seal member, thereby sealing and securing the filter element against the top panel.

31. The air cleaner assembly of claim 30, further comprising a latch mechanism between the hatch and the particulate collection bin in spaced relation to the hinge having a latched position compressing the hatch, thereby applying the axial force upon the annular seal member.

32. The air cleaner assembly of claim 30, wherein the filter element is supported by the top end cap on the particulate collection bin with only the top end cap and the annular seal member contacting the particulate collection bin when the filter element is mounted to the housing.

33. The air cleaner assembly of claim 21, further comprising a blower and a control panel for operating the blower.

34. The air cleaner assembly of claim 21, wherein the air cleaner assembly is portable wherein the particulate collection bin is mounted upon wheels.

35. The air cleaner assembly of claim 21, further including a hinge connecting the hatch to the particulate collection bin so that the hatch may pivot about the hinge between open and closed positions.

36. The filter element of claim 1, wherein the radial space wall extends radially between and connects the annular seal support with the annular disc portion.

37. The filter element of claim 12, wherein the radial space wall extends radially between and connects the annular seal support with the annular disc portion.

38. The air cleaner assembly of claim 21, wherein the radial space wall extends radially between and connects the annular seal support with the annular disc portion.

* * * * *